Feb. 28, 1956  O. G. GOLDMAN  2,736,312
SAW BLADE WITH INSERTED TEETH
Filed April 8, 1954
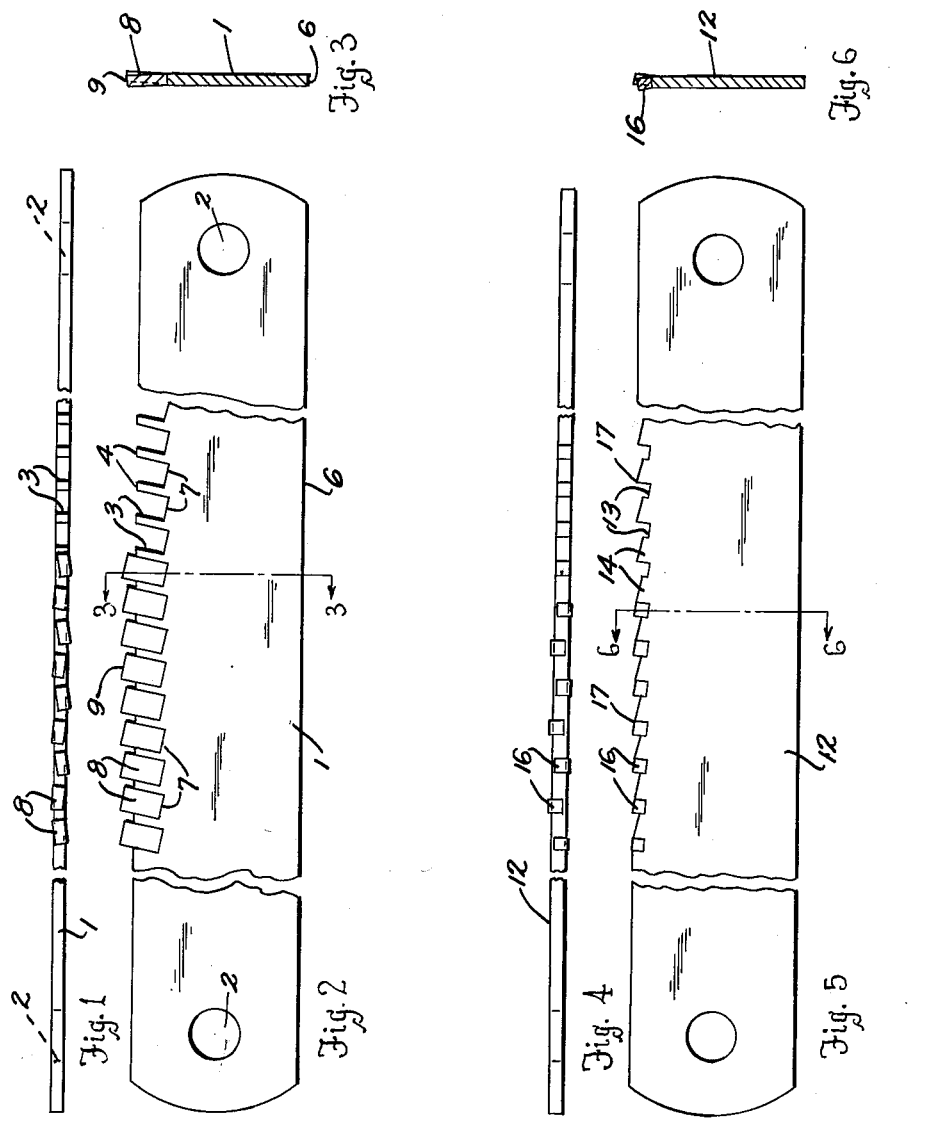
INVENTOR
OSCAR G. GOLDMAN
BY
ATTORNEY United States Patent Office 2,736,312
Patented Feb. 28, 1956

2,736,312

SAW BLADE WITH INSERTED TEETH

Oscar G. Goldman, San Francisco, Calif.

Application April 8, 1954, Serial No. 421,910

3 Claims. (Cl. 125—18)

This invention relates to a saw blade with inserted teeth.

The primary object of this invention is to provide a saw blade with teeth preferably made of carbide which are in suitably spaced relationship and offset so as to allow the necessary flexing in a saw blade while cutting, yet be adapted for cutting through masonry and stone and particularly for the cutting of certain types of conduits and pipes with concrete lining or the like.

I am aware that some changes may be made in the general arrangements and combinations of the several devices and parts, as well as in the details of the construction thereof without departing from the scope of the present invention as set forth in the following specification, and as defined in the following claims; hence I do not limit my invention to the exact arrangements and combinations of the said device and parts as described in the said specification, nor do I confine myself to the exact details of the construction of the said parts as illustrated in the accompanying drawings.

With the foregoing and other objects in view, which will be made manifest in the following detailed description, reference is had to the accompanying drawings for the illustrative embodiment of the invention, wherein:

Fig. 1 is a top edge view of a saw blade with the inserted tip.

Fig. 2 is a fragmental side view of saw blade.

Fig. 3 is a sectional view of the saw blade, the section being taken on the lines 3—3 of Fig. 2.

Fig. 4 is an edge view of a modified form of a saw blade constructed in accordance with my invention.

Fig. 5 is a fragmental side view of said modified saw blade, and

Fig. 6 is a sectional view, the section being taken on the lines 6—6 of Fig. 5.

In carrying out my invention, I make use of a saw blade 1 provided with suitable means, such as holes 2 at its ends, for securing in a saw frame.

In the preferred form of my invention, I provide in one edge of the flexible metal saw blade 1 a plurality of slots or sockets 3. The outer edges 4 of the projections between said sockets are generally in alignment with one another and are cut parallel with the back edge 6 of said blade. The bottom edge 7 of each socket 3 is slanting so that all the bottoms 7 of all the sockets 3 slant generally in the same direction.

A small piece of carbide material of generally rectangular and oblong cross-section is set in each socket 3 so that each such carbide piece projects beyond the edge 4 and forms an individual tooth. All the carbide pieces are of uniform dimensions and shape.

The bottom of each carbide piece 8 rests upon the bottom 7 of the adjacent socket 3. The abrading or cutting edge or outer end 9 of each carbide piece is thus inclined parallel with the bottom 7 of each socket 3.

In the aforedescribed manner each carbide piece or tip is individually tilted so that the cutting ends or edges 9 of all carbide pieces or inserts slant generally in the same direction.

Each carbide insert or tip is suitably cemented into its socket. In addition to the cementing, the carbide inserts are also brazed at their points of contact with the surrounding metal of the socket.

The perpendicular walls of the sockets are not at right angles to the edge 6 of the blade but are at about a 5° angle to the perpendicular so as to give to each carbide tip a rake for presenting a leading edge for the sawing operation. In view of the 5° rake the top side or cutting end 9 of each insert 8 has a 5° relief so as to present a leading corner or edge for cutting. Furthermore, as shown in Fig. 1, the respective carbide inserts 8 are also offset alternately in opposite directions for a horizontal clearance of about 2½° on the respective sides from the line or plane of the blade.

A further angular arrangement is provided as shown in Fig. 3, by alternately offsetting or slanting each carbide insert 8 at 2½° to opposite sides of the plane of the blade to provide a vertical clearance on each side.

In the modified form shown in Figs. 4 to 6 inclusive, the cutting edge of the blade 12 is formed with a plurality of sockets 13, the perpendicular sides of which are of unequal height so as to provide a tooth or inclined projection 14. The carbide insert 16 is inserted into each socket 13 and is of such height as the higher wall of the socket, namely, it is generally aligned with the leading corner or edge 17 of the tooth-like projection 14. These carbide inserts 16 are also cemented in the sockets 13 and are suitably brazed, but the shapes of these inserts 16 are generally that of a cube. The perpendicular walls of each socket 13 are again slanted at about 5° from the vertical with respect to the edge of the blade 12, so as to provide a tilt to each insert 16 with about 5° relief from the leading edge toward the trailing edge of the top of each insert 16. Each insert 16 is also offset laterally about 2½° to the respective opposite sides of the level or plane of the blade and is vertically tilted about 2½° to the opposite sides to provide respectively the horizontal clearance and vertical clearance as heretofore described.

In both forms of the invention the sawing is performed by the carbide inserts which are of sufficient hardness to perform difficult cutting operations. The inserts forming the teeth of the saw are inserted, brazed and held at said offset angles or slanting individually so that the blade can be easily repaired if any of the inserts or carbide teeth were chipped or broken.

This device is easily manufactured, it greatly improves the efficiency and life of the saw blade under difficult circumstances and it is easily repaired; the device is eminently adapted for its purposes.

I claim:

1. In a straight saw blade of the character described a cutting edge, a plurality of spaced sockets formed in said cutting edge, each socket having a bottom diverging away from the cutting edge of the blade and having sides generally at right angles to said bottom, and abrasive tips of generally oblong rectangular cross section fitting in the respective sockets, the outer ends of the respective tips being generally parallel with the bottom of the respective sockets so as to form a rake for the leading edge of the tip and a relief behind said leading edge.

2. In a straight saw blade of the character described a cutting edge, a plurality of spaced sockets formed in said cutting edge, each socket having a bottom diverging away from the cutting edge of the blade and having sides generally at right angles to said bottom, and abrasive tips of generally oblong rectangular cross section fitting in the respective sockets, the outer ends of the respective tips being generally parallel with the bottom of the respective sockets so as to form a rake for the leading edge of the tip and a relief behind said leading edge, the said perpendicular walls of said sockets being offset alternately in opposite directions so as to hold the abrasive tips alternately to opposite sides of the plane of the blade end.

3. In a straight saw blade of the character described a cutting edge, a plurality of spaced sockets formed in said cutting edge, each socket having a bottom diverging away from the cutting edge of the blade and having sides generally at right angles to said bottom, and abrasive tips of generally oblong rectangular cross section fitting in the respective sockets, the outer ends of the respective tips being generally parallel with the bottom of the respective sockets so as to form a rake for the leading edge of the tip and a relief behind said leading edge, each of the said tips extending beyond the open ends of said sockets.

References Cited in the file of this patent

UNITED STATES PATENTS

| 1,699,747 | McKay | Jan. 22, 1929 |
| 1,755,717 | Wagner | Apr. 22, 1930 |
| 1,842,789 | Langenbach | Jan. 26, 1932 |
| 2,600,272 | Segal | June 10, 1952 |

FOREIGN PATENTS

| 121,355 | Sweden | Apr. 6, 1948 |
| 275,722 | Switzerland | Aug. 16, 1951 |